United States Patent Office 3,148,205
Patented Sept. 8, 1964

3,148,205
TETRA-SUBSTITUTED BRIDGE DIPHOSPHINES
Martin Grayson, Norwalk, and Patricia Tarpey Keough, Ridgefield, Conn., assignors to American Cyanamid Company, New York, N.Y., a corporation of Maine
No Drawing. Filed Apr. 18, 1962, Ser. No. 188,542
7 Claims. (Cl. 260—465.8)

This invention relates to organophosphorus compounds and to the preparation thereof. More particularly, the present discovery concerns bridged diphosphines prepared by reacting a compound of the formula $$(A)_nP(B)_{3-n}$$

with a compound of the formula $$X'—Y—X^2$$

to produce the corresponding phosphonium halide of the formula

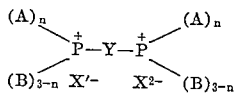

These phosphonium halides may in turn be reacted with a strong base to produce the corresponding bridged diphosphines of the formula

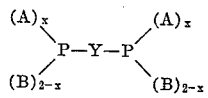

In the above formulae A represents a substituted ethyl functional group, including

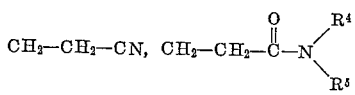

and

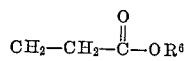

in which $R^4$ and $R^5$ each represent H and alkyl having 1 to 6 carbon atoms, and $R^6$ represents alkyl having 1 to 6 carbon atoms, said substituted ethyl functional group being attached directly to the phosphorus atom P through its unsubstituted carbon atom;

B represents bridged and straight chain alkyl having 1 to 12 carbon atoms, and substituted bridged and straight chain alkyl having 1 to 12 carbon atoms, said substituents being on a carbon atom which is at least the third atom removed from the phosphorus atom; $n$ is a value from 1 to 3, inclusively; $x$ is a value from 0 to 2, inclusively;

Y represents R', $R^2$—O—$R^3$ and $R^2$—S—$R^3$, in which R' represents branched and straight chain alkylene having 2 to 20 carbon atoms, branched and straight chain alkenylene having 2 to 20 carbon atoms, substituted branched and straight chain alkylene having 2 to 20 carbon atoms, and substituted branched and straight chain alkenylene having 2 to 20 carbon atoms, said substituted alkylene and alkenylene being substituted on a carbon atom which is at least the third carbon atom removed from each phosphorus atom, and $R^2$ and $R^3$ each represent lower alkylene;

When Y is R' and $x$ is 0, the symbol R' is an alkylene or alkenylene group whose straight-chain, bridge moiety intervening the phosphorus atoms and terminally attached thereto comprises at least 3 consecutive carbon atoms; $X^1$ and $X^2$ each represent a halogen atom, including bromine, chlorine and iodine.

A typical reaction according to the instant discovery involves intimately contacting tris(2-cyanoethyl) phosphine with 1,2-dibromoethane and reacting the resulting diquaternary phosphonium bromide with sodium ethoxide to produce tetra(2-cyanoethyl)ethylene diphosphine. The reaction may be represented by the following equation:

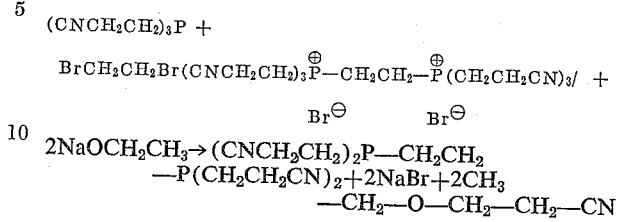

Typical strong bases within the purview of the reaction described above for the conversion of a phosphonium halide to its corresponding substituted bridged diphosphine are metal alkoxides, such as sodium methoxide, sodium ethoxide, aluminum isopropoxide, and other strong bases, such as sodium cyanide, sodium amide, and the like.

Reaction of the diquaternary phosphonium halide with a strong base may be carried out in the presence of an inert organic solvent, such as an alcohol, liquid ammonia, and the like. For example, when a metal alkoxide, such as sodium methoxide, is used as the base, the alcohol reactant, such as methanol, may be used as a reaction medium. Likewise, liquid ammonia may be employed as the solvent when sodium amide, for example, is the base reactant.

The molar ratio of $(A)_nP(B)_{3-n}$ to $X'YX^2$ contemplated herein is at least 2, usually slightly greater than 2, say, up to about 5. However, although not always practical, a ratio substantially greater than 5, such as 50 or more, may be used.

While a molar proportion of base reactant to quaternary phosphonium halide of 2 is suitable, it is by no means critical, since a concentration ratio of 25 or more may be used with satisfactory results. On the other hand, a ratio slightly less than 2, on the order of about 1.6, is suitable.

In general reactions between the dihalogen-substituted organic compounds and the organic tertiary phosphines contemplated herein are carried out at temperatures in the range of about 0° C. to about 150° C., preferably 15° C. to 115° C. If desired, this reaction may be made to take place in the presence of an inert solvent, such as glacial acetic acid, an alcohol, acetonitrile, acetone, and the like, in which case the maximum practical temperature is preferably that of the reflux temperature of the solvent used, as will be seen hereinafter.

With respect to the reaction between the intermediate diquaternary phosphonium halide and a strong base, a reaction temperature in the range of about 5° C. to about 115° C. is employed, preferably 20° C. to 80° C.

Although reaction between a tertiary phosphine of the type contemplated herein having the formula $$(A)_nP(B)_{3-n}$$

with a dihalogen-substituted compound having the formula $$X^1—Y—X^2$$

is generally carried out at atmospheric pressure, sub-atmospheric and super-atmospheric pressures are suitable. The same applies to the reaction between the diquaternary phosphonium halide and the strong base.

The products of the present invention are useful as flotation agents. Furthermore, use of these products as chelating agents is shown in the copending U.S. patent application of Lewis S. Meriwether, U.S. Serial Number 774,150, filed November 17, 1958 now U.S. Patent No. 3,032,573, issued May 1, 1962. For example, the nickel carbonyl derivative of tetra(2-cyanoethyl)ethylene diphosphine (chelate) having the following structural formula $$\begin{array}{c}\text{CNCH}_2\text{CH}_2\\ \text{CNCH}_2\text{CH}_2\end{array}\!\!\!\!\text{P—CH}_2\;\;\text{CH}_2\text{P}\!\!\!\!\begin{array}{c}\text{CH}_2\text{CH}_2\text{CN}\\ \text{CH}_2\text{CH}_2\text{CN}\end{array}$$
$$\begin{array}{c}\text{Ni}\\ \text{CO}\;\;\text{CO}\end{array}$$

may be prepared, which chelate manifests desirable properties as a catalyst in acetylene polymerization.

Typical of the dihalides contemplated herein represented by $$X^1\text{—Y—}X^2$$

are those of 1,3-(2-methylpropyl), 1,4-butyl, 1,8-octyl, 1,5-pentyl, 1,3-propyl; 1,18-diiodooctadecane; 1,12-dibromo-4-hydroxydodecane, and the like.

Among the substituents contemplated herein for Y and B in the formula $$\begin{array}{c}(A)_x\\ (B)_{2-x}\end{array}\!\!\!\!\text{P—Y—P}\!\!\!\!\begin{array}{c}(A)_x\\ (B)_{2-x}\end{array}$$

said substituents being present on a carbon atom at least the third atom removed from either phosphorus atom, are phenyl, dialkylamino, nitro, nitrile, carboxyalkyl (ester), dialkylcarbamoyl, carbamoyl, alkyl or aryl ether or thioether, acetal, keto, fluoro, chloro, hydroxyl, and the like.

The present invention will best be understood by reference to the following examples in which percentages are given in parts by weight, unless otherwise indicated:

EXAMPLE I

*Tetra(2-Cyanoethyl)Ethylene Diphosphine*

$$(\text{CNCH}_2\text{CH}_2)_2\text{P—CH}_2\text{CH}_2\text{—P—}(\text{CH}_2\text{CH}_2\text{CN})_2$$

Tris(2-cyanoethyl)phosphine (144.9 grams, 0.75 mole) is dissolved in 400 milliliters of refluxing n-butanol (about 110° C.). When solution is complete 62.7 grams (0.33 mole) of 1,2-dibromoethane is slowly added within about a 120-minute period with stirring and refluxing. The resulting mixture is then heated to a temperature of about 115° C. for 24 hours, after which it is filtered after cooling to a temperature of about 75° C. The white, crystalline phosphonium salt which precipitates during refluxing is then collected, dried at ambient temperature (21° C.–23° C.) at a pressure of about 1 millimeter and recrystallized from acetonitrile.

*Analysis.*—Calculated for $P_2N_6Br_2C_{20}H_{28}$: Br, 27.82 percent. Found: Br, 26.41 percent.

Metallic sodium (4.6 grams, 0.2 gram-atom) is reacted with 250 milliliters of absolute ethanol and cooled to 25° C. Fifty-eight grams (0.1 mole) of the 1,2-ethane bis[tris(2-cyanoethyl)phosphonium bromide] is added to the sodium ethoxide solution produced as just shown above and the resulting mixture heated to reflux (80° C.) and refluxed for 2 hours. At the end of this time the reaction mixture is concentrated by vacuum evaporation at 35° C., 10 millimeters pressure, and cooled to ambient temperature (21° C.–23° C.). Tetra(2-cyanoethyl)ethylene diphosphine separates out as a granular solid. It is recrystallized from aqueous acetone and has a melting point of 101° C. to 102° C.

*Analysis.*—Calculated for $P_2N_4C_{14}H_{20}$: C, 54.90; H, 6.58; N, 18.29; P, 20.23. Found: C, 54.71; H, 6.66; N, 18.32; P, 20.32.

EXAMPLE II

*Tetra(2-Cyanoethyl)Trimethylene Diphosphine*

$$(\text{CNCH}_2\text{CH}_2)_2\text{P—CH}_2\text{—CH}_2\text{—CH}_2\text{—P—}(\text{CH}_2\text{CH}_2\text{CN})_2$$

The phosphonium salt 1,3 propane bis[tris(2-cyanoethyl)phosphonium bromide] is prepared as described in Example I, using 130.7 grams (0.68 mole) of tris(2-cyanoethyl)phosphine and 60.6 grams of (0.30 mole) 1,3-dibromopropane. The phosphonium salt is obtained as a white crystalline solid melting at 215° C.–216° C.

*Analysis.*—Calculated for $P_2N_6Br_2C_{21}H_{30}$: Br, 27.16 percent. Found: Br, 24.89 percent.

This phosphonium salt is reacted, also as in Example I, with 6.7 grams (0.292 gram-atom) of metallic sodium. The resulting crystalline, tetra(2-cyanoethyl) trimethylene diphosphine is recrystallized from aqueous acetic acid and has a melting point of 53° C.–54° C.

*Analysis.*—Calculated for $P_2N_4C_{15}H_{22}$: C, 56.24; H, 6.93; N, 17.49; P, 19.34. Found: C, 56.21; H, 7.02; N, 17.24; P, 19.26.

EXAMPLE III

*Tetramethyltrimethylenediphosphine*

$$(\text{CH}_3)_2\text{—P—CH}_2\text{CH}_2\text{CH}_2\text{—P—}(\text{CH}_3)_2$$

Dimethyl(2-cyanoethyl)phosphine (30.6 grams, 0.266 mole) is reacted with 1,3-dibromopropane (20.2 grams, 0.1 mole) as described in Example I. The resulting phosphonium salt, 1,3 propane bis[dimethyl(2-cyanoethyl)phosphonium bromide] (35 grams, 0.081 mole) is treated, also as in Example I, above, with 3.8 grams (0.162 gram-atom) of sodium. Tetramethyltrimethylenediphosphine is obtained in good yield.

EXAMPLE IV

*Tetra(2-Carboethoxyethyl)Ethylene Diphosphine*

$$(\text{C}_2\text{H}_5\text{O}\overset{\text{O}}{\overset{\|}{\text{C}}}\text{CH}_2\text{CH}_2\text{C})_2\text{—P—CH}_2\text{—CH}_2\text{—P—}(\text{CH}_2\text{CH}_2\overset{\text{O}}{\overset{\|}{\text{C}}}\text{O C}_2\text{H}_5)_2$$

Tris(2-carboethoxyethyl)phosphine (167 grams, 0.5 mole) is reacted with 1,2-dibromoethane (54.2 grams, 0.2 mole) as described in Example I, with the exception that the solvent used is ethanol and reflux temperature is about 80° C. The resulting phosphonium salt, 1,2 ethane bis[tris(2 - carboethoxyethyl)phosphonium bromide] (150 grams, 0.175 mole), is reacted, also as shown in Example I, with 8.0 grams (0.3 gram-atom) of metallic sodium to give tetra(2-carboethoxyethyl)ethylene diphosphine.

EXAMPLE V

*Tetra(2-Cyanoethyl)3-Oxapentylene Diphosphine*

$$(\text{CH}_2\text{CH}_2\text{CN})_2\text{—P—CH}_2\text{CH}_2\text{OCH}_2\text{CH}_2\text{P—}(\text{CH}_2\text{CH}_2\text{CN})_2$$

Tris(2-cyanoethyl)phosphine (144.9 grams, 0.75 mole) is reacted with 47.3 (0.33 mole) of 2,2′dichloro diethyl ether, as described in Example I, to give 3-oxapentyl 1,5-bis[tris(2-cyanoethyl)phosphonium chloride]. Upon treatment with 4.6 grams (0.2 gram-atom) of metallic sodium, 53.9 grams (0.1 mole) of this phosphonium salt yields tetra(2-cyanoethyl)3-oxapentylene diphosphine.

EXAMPLE VI

*Tetra(2-Cyanoethyl)2-Butenylene Diphosphine*

$$(\text{CH}_2\text{CH}_2\text{CN})_2\text{P—CH}_2\text{CH}_2\!\!=\!\!\text{CHCH}_2\text{—P—}(\text{CH}_2\text{CH}_2\text{CN})_2$$

Tris(2-cyanoethyl)phosphine (144.9 grams, 0.75 mole) is reacted with 41.4 grams (0.33 mole) of 1,4 dichloro butene-2 to give 2-butene-1,4-bis[tris(2-cyanoethyl)phosphonium chloride]. Fifty-one grams (0.1 mole) of this phosphonium salt is then treated with 4.6 grams (0.2 gram-atom) of metallic sodium to yield tetra(2-cyanoethyl)2-butenylene diphosphine.

EXAMPLE VII

*Tetranonyl 1, 10-Decylenediphosphine*

$$(\text{C}_9\text{H}_{19})_2\text{P}(\text{CH}_2)_{10}\text{P}(\text{C}_9\text{H}_{19})_2$$

The diphosphonium salt is prepared as in Example I, above, from 68 grams (0.20 mole) of dinonyl 2-cyanoethyl phosphine and 30 grams (0.10 mole) of 1,10-dibromodecane and the product tetranonyl 1,10-decylenediphosphine is obtained, as in Example I, by reaction of the diphosphonium salt above with 4.6 grams of metallic sodium.

EXAMPLES VIII–XXIV

Example I, above, is repeated in every essential respect substituting, however, the reactants in the following table and recovering the corresponding products:

Table I

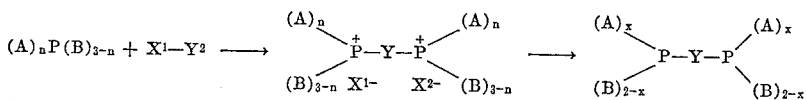

$(A)_nP(B)_{3-n} + X^1-Y^2 \longrightarrow \underset{(B)_{3-n}}{\overset{(A)_n}{P}}-Y-\underset{X^{2-}(B)_{3-n}}{\overset{(A)_n}{P}} \longrightarrow \underset{(B)_{2-x}}{\overset{(A)_x}{P}}-Y-\underset{(B)_{2-x}}{\overset{(A)_x}{P}}$

| Exam. No. | (n) | (A) | (B) | | | (x) | |
|---|---|---|---|---|---|---|---|
| VIII | 2 | 2-cyanoethyl | phenyl | 1,20-dibromo eicosane. | 1,20-eicosanebis [bis (2-cyanoethyl) phenylphosphonium bromide]. | 1 | 1,20-eicosanebis [2-cyanoethylphenylphosphine]. |
| IX | 2 | ---do--- | 3-dimethylaminopropyl. | 1,5-dichloro-3-thiapentane. | 1,5-(3-thiapentane) bis [bis (2-cyanoethyl)-3-dimethylaminopropyl phosphonium chloride]. | 1 | 1,5-(3-thiapentane) bis [2-cyanoethyl-3-dimethyl-amino-propylphosphine]. |
| X | 2 | ---do--- | 3-hydroxypropyl. | 1,2-diiodoethane. | 1,2-ethanebis[bis(2-cyanoethyl)-3-hydroxypropyl-phosphonium iodide]. | 1 | 1,2-ethanebis[2-cyanoethyl-3-hydroxypropylphosphine]. |
| XI | 2 | 2-(N,N-dimethyl carbamoyl) ethyl. | 3-nitropropyl. | 1,3-diiodopropane. | 1,3-propanebis[bis(2-[N,N-dimethylcarbamoyl] ethyl)-3-nitropropyl-phosphonium iodide]. | 1 | 1,3-propanebis[2-(N,N-dimethylcarbamoyl) ethyl-3-nitro propyl-phosphine]. |
| XII | 2 | 2-cyanoethyl | 3-cyanopropyl. | 1,5-diiodo-3-chloropentane. | 1,5-(3-chloropentane)-bis [bis(2-cyanoethyl)-3-cyanopropylphosphonium iodide]. | 1 | 1,5-(3-chloropentane)bis[2-cyanoethyl-3-cyanopropylphosphine]. |
| XIII | 2 | 2-carbamoylethyl. | 3,3-dimethoxypropyl. | 1,5-diiodo-3-methoxypentane. | 1,5-(3-methoxypentane)bis [bis(2-carbamoylethyl)-3,3,dimethoxypropyl-phosphonium iodide]. | 1 | 1,5-(3-methoxypentane)bis [2-carbamoylethyl-3,3-dimethoxypropyl phosphine]. |
| XIV | 2 | 2-carbohexoxyethyl. | 10-carboethoxydecyl. | 1,7-dibromo-4-ketoheptane. | 1,7-(4-ketoheptane)bis[bis-2-carbohexoxyethyl)-10-carboethoxydecylphosphonium bromide]. | 1 | 1,7-(4-ketoheptane)bis[2-carbohexoxyethyl-10-carboethoxydecylphosphine]. |
| XV | 2 | 2-cyanoethyl | 3-butoxypropyl. | 1,5-diiodo-3-hydroxypentane. | 1,5-(3-hydroxypentane)bis [bis(2-cyanoethyl)-3-butoxypropylphosphonium iodide]. | 1 | 1,5-(3-hydroxypentane)bis [2-cyanoethyl-3-butoxypropylphosphine]. |
| XVI | 1 | ---do--- | 3-phenoxypropyl. | 1,5-diiodo-3-cyanopentane. | 1,5-(3-cyanopentane)bis[2-cyanoethylbis(3-phenoxypropyl)phosphonium iodide]. | 0 | 1,5-(3-cyanopentane)bis[bis (3-phenoxypropyl)phosphine]. |
| XVII | 1 | ---do--- | 3-carbamoyl propyl. | 1,5-diiodo-3-phenylpentane. | 1,5-(3-phenylpentane)bis [2-cyanoethylbis(3-carbamoylpropyl)phosphonium iodide]. | 0 | 1,5-(3-phenylpentane)bis [bis(3-carbamoylpropyl) phosphine]. |
| XVIII | 2 | ---do--- | 2-cyanoethyl | 1,4-dibromo-2-methylbutane. | 1,4-(2-methylbutane)bis [tris(2-cyanoethyl)phosphonium bromide]. | 1 | 1,4-(2-methylbutane)bis[bis (2-cyanoethyl)phosphine]. |
| XIX | 2 | ---do--- | 3-phenoxypropyl. | 1,5-diiodo-3-carbethoxypentane. | 1,5-(3-carbethoxypentane) bis[bis(2-cyanoethyl)-3-phenoxypropylphosphonium iodide]. | 1 | 1,5-(3-carbethoxypentane) bis[2-cyanoethyl-3-phenoxypropylphosphine]. |
| XX | 2 | ---do--- | 2-methylpropyl. | 1,5-diiodo-3-(N,N-diethylcarbamoyl)pentane. | 1,5-[3-(N,N-diethylcarbamoyl)pentane]bis[bis(2-cyanoethyl)-2-methylpropylphosphonium iodide]. | 1 | 1,5-[3-(N,N-diethylcarbamoyl)pentane]bis[(2-cyanoethyl)-2-methylpropylphosphine]. |
| XXI | 2 | ---do--- | 3-phenoxypropyl. | 1,5-diiodo-3-phenoxypentane. | 1,5-(3-phenoxypentane)-bis[bis(2-cyanoethyl)-3-phenoxypropylphosphonium iodide]. | 1 | 1,5-(3-phenoxypentane)bis-[(2-cyanoethyl)-3-phenoxy-propylphosphine]. |
| XXII | 2 | ---do--- | ---do--- | 1,5-diiodo-3-carbamoylpentane. | 1,5-(3-carbamoylpentane)-bis[bis(2-cyanoethyl)-3-phenoxypropylphosphonium iodide]. | 1 | 1,5-(3-carbamoylpentane)-bis[(2-cyanoethyl)-3-phenoxypropylphosphine]. |
| XXIII | 2 | ---do--- | ---do--- | 1,5-diiodo-3-dimethylaminopentane. | 1,5-(3-dimethylaminopentane)bis[bis(2-cyanoethyl)-3-phenoxypropylphosphonium iodide]. | 1 | 1,5-(3-dimethylaminopentane)bis[(2-cyanoethyl)-3-phenoxypropylphosphine]. |
| XXIV | 2 | ---do--- | ---do--- | 1,5-diiodo-3-fluoropentane. | 1,5-(3-fluoropentane)bis-[bis(2-cyanoethyl)-3-phenoxypropylphosphonium iodide]. | 1 | 1,5-(3-fluoropentane)bis-[(2-cyanoethyl)-3-phenoxy-propylphosphine]. |

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

The instant application is a continuation-in-part of U.S. application Serial No. 774,157, filed November 17, 1958, and now abandoned.

We claim:

1. An organophosphorus bridged diphosphine corresponding to the formula

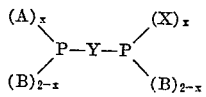

wherein Y represents a member selected from the group consisting of R', R²—O—R³ and R²—S—R³, in which R' represents a member selected from the group consisting of branched and straight chain alkylene having 2 to 20 carbon atoms, branched and straight chain alkenylene having 2 to 20 carbon atoms, mono-substituted branched and straight chain alkylene having from 2 to 20 carbon atoms, mono-substituted branched and straight chain alkenylene having 2 to 20 carbon atoms, R² and R³ each represent lower alkylene, said substituted alkylenes and alkenylenes having their substituents on a carbon atom which is at least the third carbon atom removed from each phosphorus atom; both A's in the above formula are the same in any given compound, each A representing a substituted ethyl functional group selected from the group consisting of

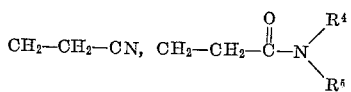

and

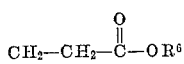

in which $R^4$ and $R^5$ each represents a member selected from the group consisting of H and alkyl having 1 to 6 carbon atoms, and $R^6$ represents a member selected from the group consisting of alkyl having 1 to 6 carbon atoms, said substituted ethyl functional group being attached directly to P through its unsubstituted carbon atom; B represents a member selected from the group consisting of branched and straight chain alkyl having 1 to 12 carbon atoms, and substituted branched and straight chain alkyl having 1 to 12 carbon atoms, said substituted alkyl groups having their substituents on a carbon atom at least the third atom removed from the phosphorus atom; $x$ is a value from 1 to 2, inclusively; said substituents for Y, above, being selected from the group consisting of phenyl, dimethylamino, nitrile, carbethoxy, N,N-diethylcarbamoyl, carbamoyl, methoxy, phenoxy, keto, fluoro, chloro and hydroxyl and said substituents for B, above, being selected from the group consisting of dimethylamino, nitro, nitrile, carbethoxy, carbamoyl, methoxy, butoxy, phenoxy, and hydroxyl.

2. An organophosphorus tetra-substituted bridged diphosphine corresponding to the formula

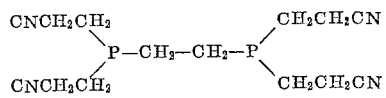

3. An organophosphorus tetra-substituted bridged diphosphine corresponding to the formula

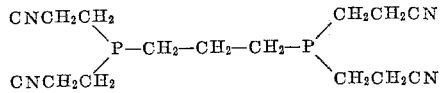

4. An organophosphorus tetra-substituted bridged diphosphine corresponding to the formula

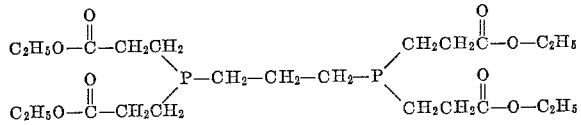

5. A diquaternary phosphonium halide corresponding to the formula

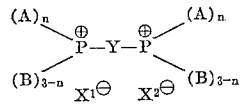

wherein Y represents a member selected from the group consisting of R', $R^2$—O—$R^3$ and $R^2$—S—$R^3$, in which R' represents a member selected from the group consisting of branched and straight chain alkylene having 2 to 20 carbon atoms, branched and straight chain alkenylene having 2 to 20 carbon atoms, mono-substituted branched and straight chain alkylene having 2 to 20 carbon atoms, and mono-substituted branched and straight chain alkenylene having from 2 to 20 carbon atoms, $R^2$ and $R^3$ each represent lower alkylene, said substituted alkylenes and alkenylenes having their substituents on a carbon atom which is at least the third carbon atom removed from each phosphorus atom; A represents a substituted ethyl functional group selected from the group consisting of $CH_2$—$CH_2$—$CN$,

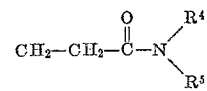

and

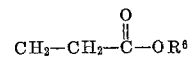

in which $R^4$ and $R^5$ each represent a member selected from the group consisting of H and alkyl having 1 to 6 carbon atoms, and $R^6$ represents a member selected from the group consisting of alkyl having 1 to 6 carbon atoms, said substituted ethyl functional group being attached directly to P through its unsubstituted carbon atom; B represents a member selected from the group consisting of branched and straight chain alkyl having 1 to 12 carbon atoms and substituted branched and straight chain alkyl having 1 to 12 carbon atoms, said substituted alkyl groups having their substituents on a carbon atom at least the third atom removed from the phosphorus atom; $X^1$ and $X^2$ each represent a member selected from the group consisting of chlorine, bromine and iodine; $n$ is a value from 1 to 3, inclusively; said substituents for Y, above, being selected from the group consisting of phenyl, dimethylamino, nitrile, carbethoxy, N,N,-diethylcarbamoyl, carbamoyl, methoxy, phenoxy, keto, fluoro, chloro and hydroxyl, and said substituents for B, above, being selected from the group consisting of dimethylamino, nitro, nitrile, carbethoxy, carbamoyl, methoxy, butoxy, phenoxy, and hydroxyl.

6. An organophosphorus bridged diphosphonium salt corresponding to the formula

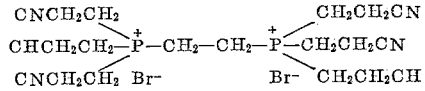

7. An organophosphorus bridged diphosphonium salt corresponding to the formula

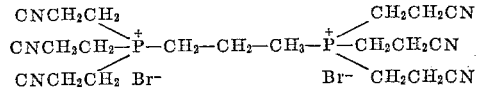

References Cited in the file of this patent
UNITED STATES PATENTS
3,005,013    Grayson et al. _____ Oct. 17, 1961

UNITED STATES PATENT OFFICE
CERTIFICATE OF CORRECTION

Patent No. 3,148,205                      September 8, 1964

Martin Grayson et al.

It is hereby certified that error appears in the above numbered patent requiring correction and that the said Letters Patent should read as corrected below.

Columns 5 and 6, Table Ι, the left-hand portion of the formula should appear as shown below instead of as in the patent:

column 5, lines 72 to 75, the formula should appear as shown below instead of as in the patent:

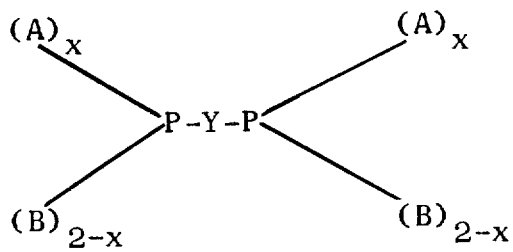

column 8, lines 49 to 53, the formula should appear as shown below instead of as in the patent:

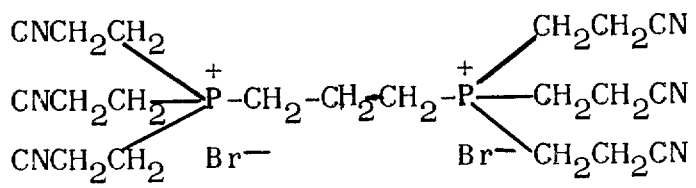

Signed and sealed this 30th day of March 1965.

(SEAL)
Attest:

ERNEST W. SWIDER                      EDWARD J. BRENNER
Attesting Officer                     Commissioner of Patents

UNITED STATES PATENT OFFICE
CERTIFICATE OF CORRECTION

Patent No. 3,148,205                      September 8, 1964

Martin Grayson et al.

It is hereby certified that error appears in the above numbered patent requiring correction and that the said Letters Patent should read as corrected below.

Column 8, lines 43 to 46, the formula should appear as shown below instead of as in the patent:

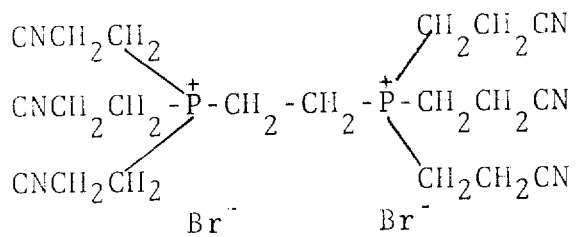

Signed and sealed this 21st day of September 1965.

(SEAL)
Attest:

ERNEST W. SWIDER
Attesting Officer

EDWARD J. BRENNER
Commissioner of Patents